(12) United States Patent
Fsadni

(10) Patent No.: US 8,215,444 B2
(45) Date of Patent: Jul. 10, 2012

(54) ROLL RESTRICTOR SYSTEM FOR AN AUTOMOTIVE POWERTRAIN

(75) Inventor: Michael Fsadni, Garden City, MI (US)

(73) Assignee: Ford Global Technologies, Dearborn, MI (US)

( * ) Notice: Subject to any disclaimer, the term of this patent is extended or adjusted under 35 U.S.C. 154(b) by 421 days.

(21) Appl. No.: 12/499,994

(22) Filed: Jul. 9, 2009

(65) Prior Publication Data
US 2011/0005854 A1    Jan. 13, 2011

(51) Int. Cl.
*B60K 1/00*    (2006.01)
(52) U.S. Cl. .................................... 180/300; 180/299
(58) Field of Classification Search .............. 180/297, 180/300, 291, 299, 292; 248/647, 675, 638, 248/635, 606, 559
See application file for complete search history.

(56) References Cited

U.S. PATENT DOCUMENTS

| | | | | |
|---|---|---|---|---|
| 2,034,764 | A * | 3/1936 | Lee | 248/606 |
| 3,825,090 | A * | 7/1974 | Runkle et al. | 180/292 |
| 4,381,043 | A * | 4/1983 | Fukushima | 180/300 |
| 4,406,344 | A * | 9/1983 | Fukushima | 180/300 |
| 4,456,213 | A * | 6/1984 | Fukushima et al. | 248/559 |
| 4,693,217 | A * | 9/1987 | Beer | 123/195 A |
| 4,779,834 | A * | 10/1988 | Bittner | 248/638 |
| 5,052,530 | A * | 10/1991 | Shimazaki | 248/606 |
| 5,967,251 | A * | 10/1999 | Turl et al. | 180/297 |
| 6,321,890 | B1 | 11/2001 | Suzuki et al. | |
| 6,460,822 | B1 | 10/2002 | Lee | |
| 6,629,576 | B2 * | 10/2003 | Kramer et al. | 180/291 |
| 7,040,446 | B2 | 5/2006 | Anzai et al. | |
| 7,232,005 | B2 * | 6/2007 | Komatsu et al. | 180/299 |

* cited by examiner

*Primary Examiner* — Hau Phan
(74) *Attorney, Agent, or Firm* — Jerome R. Drouillard; Julia Voutyras

(57) ABSTRACT

A roll restrictor system for an automotive powertrain includes a first mounting pad located upon a powertrain component and a mounting bracket having an integral bushing post, with the mounting bracket being attached to the first mounting pad. A control link has a first bushing engaged with the integral bushing post portion of the mounting bracket, and a second bushing engaged with a vehicular structural member.

11 Claims, 2 Drawing Sheets

ROLL RESTRICTOR SYSTEM FOR AN AUTOMOTIVE POWERTRAIN

BACKGROUND OF THE DISCLOSURE

1. Field of the Disclosure

The present disclosure relates to a roll restrictor for preventing unwanted axially directed rotation of an automotive powertrain.

2. Related Art

Automotive powertrains, particularly powertrains used with front wheel drive vehicles and featuring an engine and transaxle mounted in a conventional east-west configuration—i.e., with the engine's crankshaft perpendicular to the longitudinal center line of the vehicle—utilize roll restrictors to prevent unwanted rotation of the engine and transaxle about an axis which, if not coincidental with the engine's crankshaft center axis, is at least parallel thereto.

Known automotive powertrain roll restrictors utilize bracketry for attaching the restrictor to the transaxle or engine, with brackets that include a separate post for connecting link bushings. Such posts are attached by a fastener which is intended to subject the post to sufficient frictional force at its ends to prevent slippage between the remainder of the bracket and the post itself. Unfortunately, if the clamp load imposed upon the post by the fastener is lost for whatever reason, or it is, indeed, insufficient from the time of initial assembly, resultant slippage between the bushing post and the bulk of the bracket will often times cause a portion of the roll restrictor to fail; in some cases, a failure may involve a roll restrictor mounting pad incorporated in a transaxle. Needless to say such failure engenders considerable expense and inconvenience.

It would be desirable to provide a roll restrictor which prevents slippage between a control link bushing and the bracketry attached to an engine or transaxle.

SUMMARY OF THE DISCLOSURE

According to an aspect of the present disclosure, a roll restrictor system for an automotive powertrain includes a first mounting pad located upon a powertrain component, and a mounting bracket having an integral bushing post, with the mounting bracket being attached to the first mounting pad. A control link has a first bushing engaged with the integral bushing post, and a second bushing engaged with the vehicle's structural member.

According to a preferred embodiment, the integral bushing post is one-piece with the mounting bracket.

According to another aspect of the present disclosure, the first mounting pad could be located upon a vehicle transaxle or vehicle engine, with the control link being generally parallel to the vehicle's longitudinal center line.

According to another aspect of the present disclosure, a roll restrictor mounting bracket may include a one-piece U-shaped member having a number of towers which are bored to accept fasteners extending into a mounting pad configured upon a powertrain component, with a bridge section extending between outboard ends of the towers, and with one of the towers being configured as an integral bushing post. As an alternative, the mounting bracket may be configured as a one-piece member having a base with at least three fasteners extending through the base and into a powertrain mounting pad, and with one of the fasteners extending through a bushing post, with the post being one-piece with the base.

According to another aspect of the present disclosure, a control link has a first bushing including an annular elastomeric isolator having a central bore engaged with an integral bushing post, and a second bushing engaged with a vehicle structural member.

It is an advantage of a present roll restrictor system that the number of parts needed to install the system is less, as compared with known systems.

It is yet another advantage of a roll restrictor system according to the present disclosure that higher loads may be imposed upon the system without failure of the system, as compared with known alternative systems.

It is yet another advantage of the present roll restriction system that the fewer number of components which are needed reduce manufacturing, shipping, storage and inventory costs.

Other advantages, as well as features of the present system, will become apparent to the reader of this specification.

DETAILED DESCRIPTION OF THE PREFERRED EMBODIMENTS

Figure 1:
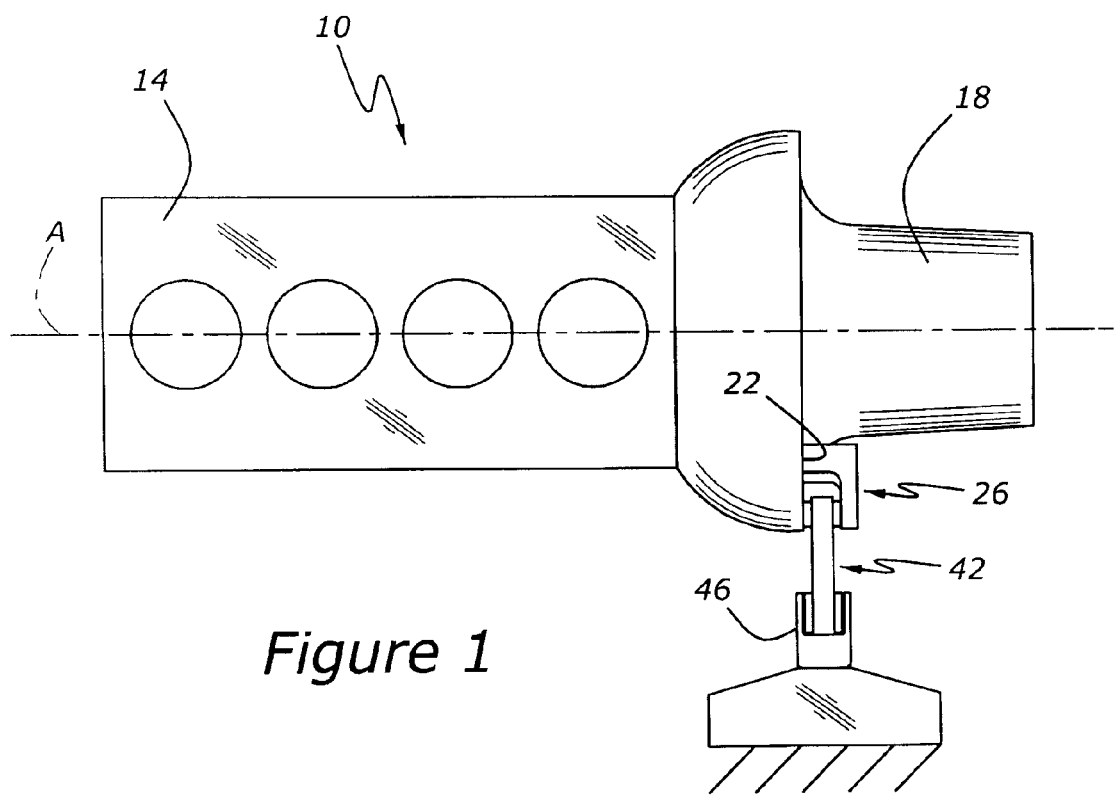
FIG. 1 is a schematic representation of an automotive powertrain having a roll restrictor system according to the present disclosure.
Figure 2:
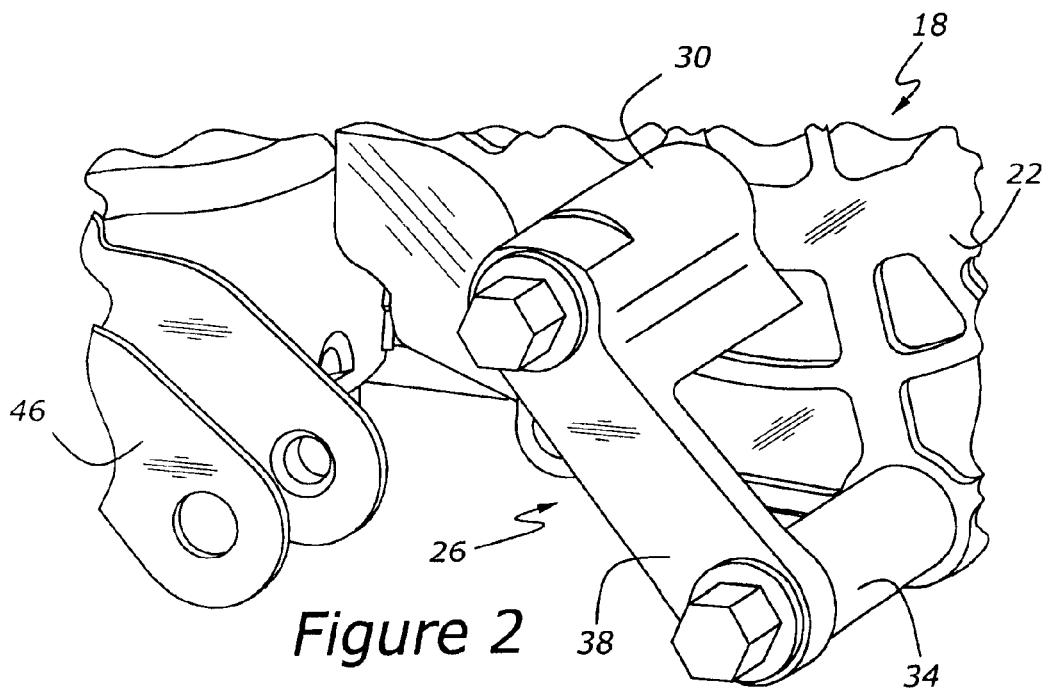
FIG. 2 is a perspective view of a portion of a roll restrictor system according to the present disclosure.
Figure 3:
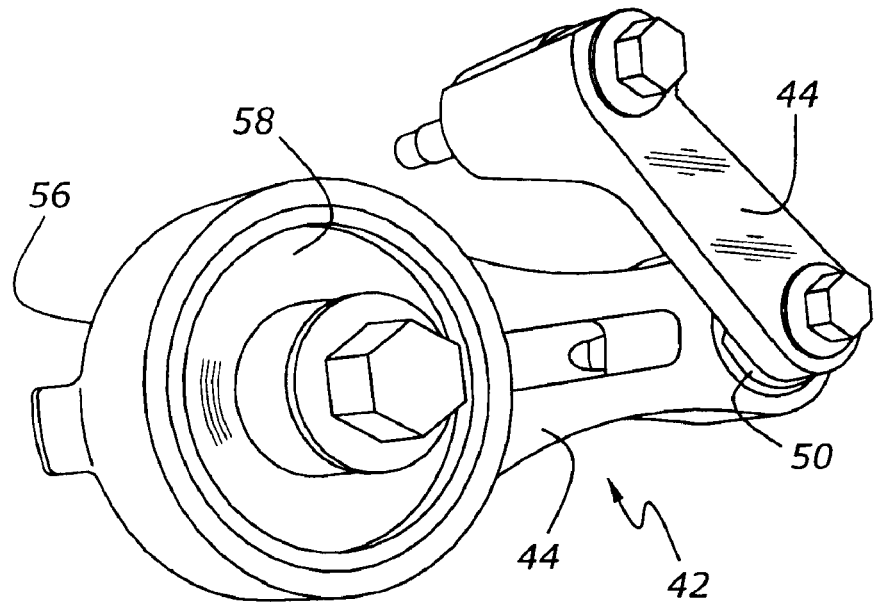
FIG. 3 illustrates a mounting bracket and control link of a roll restrictor system according to the present disclosure.

As shown in FIG. 1, an automotive powertrain, 10, having a four-cylinder engine, 14, and a transaxle, 18, has a center longitudinal center line A, and also includes a roll restriction system. Accordingly, transaxle 18 includes a first mounting pad, 22, to which a mounting bracket, 26, is installed. Details of mounting bracket 26 are shown in FIGS. 2 and 3. Those skilled in the art will appreciate in view of this disclosure that the present roll restrictor system is useful with not only the illustrated four-cylinder engine, but also with other types of engines having other numbers of cylinders, including engines having v-block and inline configurations.

As shown in FIG. 2, mounting bracket 26 includes a first tower 30, and a second tower 34, which functions as an integral bushing post. Towers 30 and 34 are bored to accept fasteners extending into first mounting pad 22 of transaxle 18. Mounting bracket 26 also includes a bridge section, 38, which extends between outboard ends of towers 30 and 34. Because mounting bracket 26 is one-piece, particularly with the inclusion of integral bushing post 34 as a second tower, it is not possible for an inner portion of a bushing connected to a control link (shown at 42 in FIGS. 3 and 4) to slip with respect to bracket 26.

Details of control link 42 are shown first in FIG. 3. In general, the control link includes a beam, 44, having a first bushing, 50, which is pressed upon integral bushing post 34, and a second bushing, 58, which is pressed into the large end, 56, of beam 44. Large end 56 of control link 42 is affixed to vehicle structural member 46 (FIGS. 2 and 4) by a through bolt (not shown) which passes through structural member 46, which is illustrated in FIGS. 2 and 3 as a clevis, as well as through a central bore formed in second bushing 58. Those skilled in the art will appreciate in view of this disclosure that structural member 46 could be configured as a subframe or other robust structural component.

Figure 4:
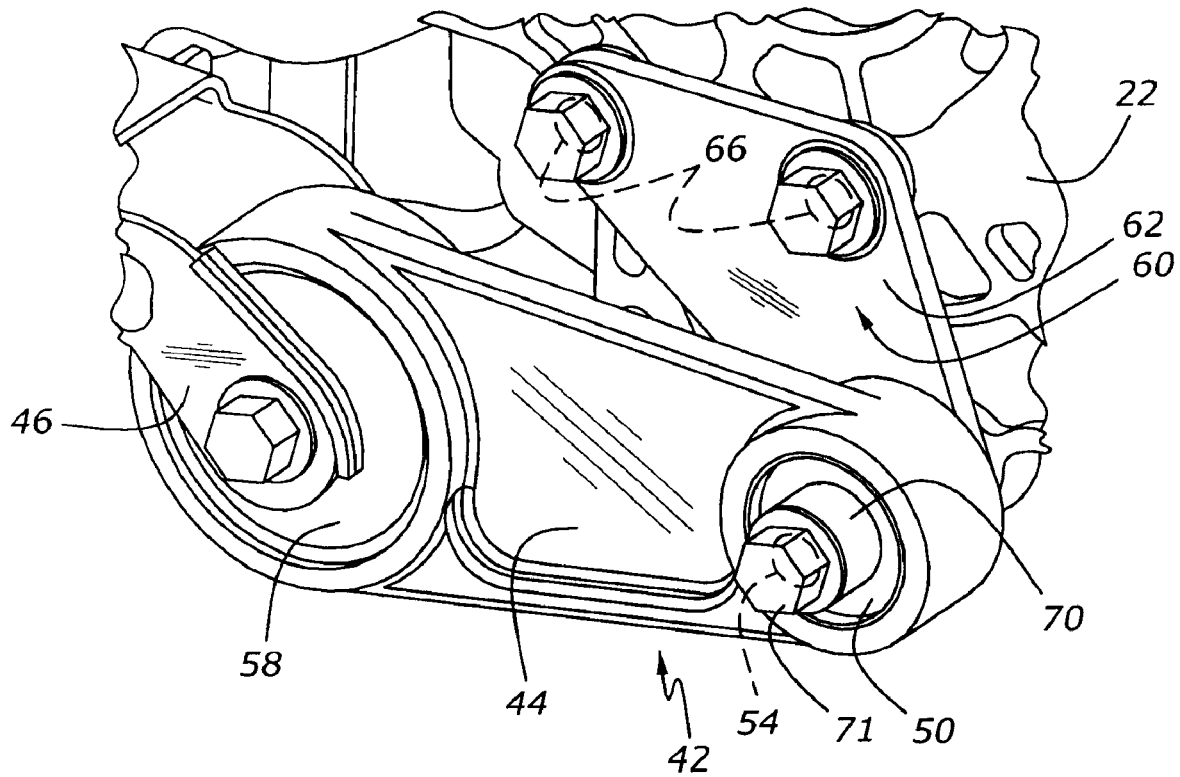
FIG. 4 is a perspective view of a second embodiment of a roll restrictor system according to the present disclosure.

FIG. 4 illustrates a second embodiment of the present disclosure in which a mounting bracket, 60, has a base, 62, with a number of apertures, 66, for attaching mounting bracket 60 to components such as transaxle 22. Base 62 also has bushing post 70 incorporated therein, through which a fastener, 71 passes into first mounting pad 22 of transaxle 18. Control link 44, in FIG. 4 is maintained in contact with bracket 60 by means of a fastener 71 which is, as noted above, driven through the center of post 70.

According to another aspect of the present disclosure, the first and second bushings employed in control link 44 may be configured from elastomeric materials such as urethane materials and other types of composite and elastomeric and non-elastomeric bushing materials known to those skilled in the art and suggested by this disclosure. Regardless of the particular bushing material chosen, the embodiment of FIG. 4 offers the advantages of the embodiment shown in FIGS. 2 and 3, because the embodiment of FIG. 4 also features an integral bushing post, 70, which prevents slip between the center portion of the first or small end bushing 50 and bracket 60.

The foregoing system has been described in accordance with the relevant legal standards, thus the description is exemplary rather than limiting in nature. Variations and modifications to the disclosed embodiments may become apparent to those skilled in the art and fall within the scope of the disclosure. Accordingly, the scope of legal protection afforded can only be determined by studying the following claims.

What is claimed is:

1. A roll restrictor system for an automotive powertrain, comprising:
   a first mounting pad located upon a powertrain component;
   a mounting bracket having an integral bushing post, with said mounting bracket being configured as a one-piece member comprising a base having at least three fasteners extending through said base into said first mounting pad, and with one of said at least three fasteners extending through said bushing post, and with said bushing post being one-piece with said base; and
   a control link having a first bushing engaged with said integral bushing post and a second bushing engaged with a vehicle structural member.

2. A roll restrictor according to claim 1, wherein said first mounting pad is located upon a vehicle transaxle.

3. A roll restrictor according to claim 1, wherein said vehicle structural member comprises a subframe.

4. A roll restrictor according to claim 1, wherein said first bushing and said second bushing comprise elastomeric materials.

5. A roll restrictor according to claim 4, wherein said first bushing and said second bushing comprise urethane material.

6. A roll restrictor according to claim 1, wherein said first bushing is pressed upon said integral bushing post.

7. A roll restrictor according to claim 1, wherein said control link applies roll restraining force along an axis which is generally parallel to a longitudinal centerline of the powertrain.

8. A roll restrictor system for an automotive powertrain, comprising:
   a first mounting pad located upon a transaxle;
   a one-piece mounting bracket having an integral bushing post, with said mounting bracket comprising a U-shaped member having two towers which are bored to accept threaded fasteners extending into said transaxle, and a bridge section extending between outboard ends of said towers, and with one of said towers being configured as said integral bushing post; and
   a control link having a first bushing comprising an annular elastomeric isolator having a central bore engaged with said integral bushing post, and a second bushing engaged with a vehicle structural member.

9. A roll restrictor according to claim 8, wherein said vehicle structural member comprises a subframe.

10. A roll restrictor according to claim 8, wherein said annular elastomeric isolator is pressed upon said integral bushing post.

11. A roll restrictor according to claim 8, wherein said control link applies roll restraining force along an axis which is generally parallel to a longitudinal centerline of the powertrain.

* * * * *